United States Patent [19]
Hoff

[11] Patent Number: 5,605,359

[45] Date of Patent: Feb. 25, 1997

[54] STABILIZED HOSE FITTING FOR COUPLING

[75] Inventor: Steven R. Hoff, Franklin, Tenn.

[73] Assignee: Dana Corporation, Toledo, Ohio

[21] Appl. No.: 458,410

[22] Filed: Jun. 2, 1995

[51] Int. Cl.$^6$ ................................................ F16L 55/00
[52] U.S. Cl. .......................... 285/92; 285/259; 285/328; 285/330
[58] Field of Search .......................... 285/259, 92, 328, 285/330

[56] References Cited

U.S. PATENT DOCUMENTS

| | | | |
|---|---|---|---|
| 1,532,886 | 4/1925 | Cowles | 285/259 X |
| 2,410,600 | 11/1946 | Cowles | 285/259 X |
| 4,363,337 | 12/1982 | Pease | 285/330 X |
| 4,420,022 | 12/1983 | Landry | 285/330 X |
| 4,927,187 | 5/1990 | Sanford et al. | 285/330 X |
| 4,969,669 | 11/1990 | Sauer | 285/256 |
| 5,038,819 | 1/1992 | Bynum | 285/89 |
| 5,094,491 | 3/1992 | Berghammer et al. | 285/92 |
| 5,094,493 | 3/1992 | Sauer | 285/256 |
| 5,269,566 | 12/1993 | Do et al. | 285/92 X |
| 5,348,349 | 9/1994 | Sloane | 285/92 |
| 5,362,111 | 11/1994 | Harbin | 285/92 |

Primary Examiner—Eric K. Nicholson
Assistant Examiner—Heather Shackelford
Attorney, Agent, or Firm—Millen, White, Zelano & Branigan, P. C.

[57] ABSTRACT

Failure of push-to-connect couplings which, for example, connect reinforced hoses to ports in valve bodies is prevented by an anti-rotation collar. The ports have a projecting external hex nut fixed to the valve body. A rigid tube is received within the push-to-connect coupling which in accordance with a first embodiment, has fixed thereon a collar with a pair of arms having flat surfaces which engage opposed flats on the hex nut. In accordance with the second and third embodiments of the invention, the anti-rotation collar has a projection, such as a pin, which is received in a hole fixed in the valve body. The collar has a hexagonal recess therein which receives a hexagonal projection from the rigid tube which prevents rotation of the collar with respect to the tube. In this way, the tube is fixed with respect to the valve body and does not rotate so as to cause failure of a collet within the push-to-connect coupling which radially engages a first portion of the rigid tube to axially retain the rigid tube in the coupling. A second portion of the rigid tube has an end of the reinforced hose fixed thereto by either a crimping collar or a screw thread.

4 Claims, 2 Drawing Sheets

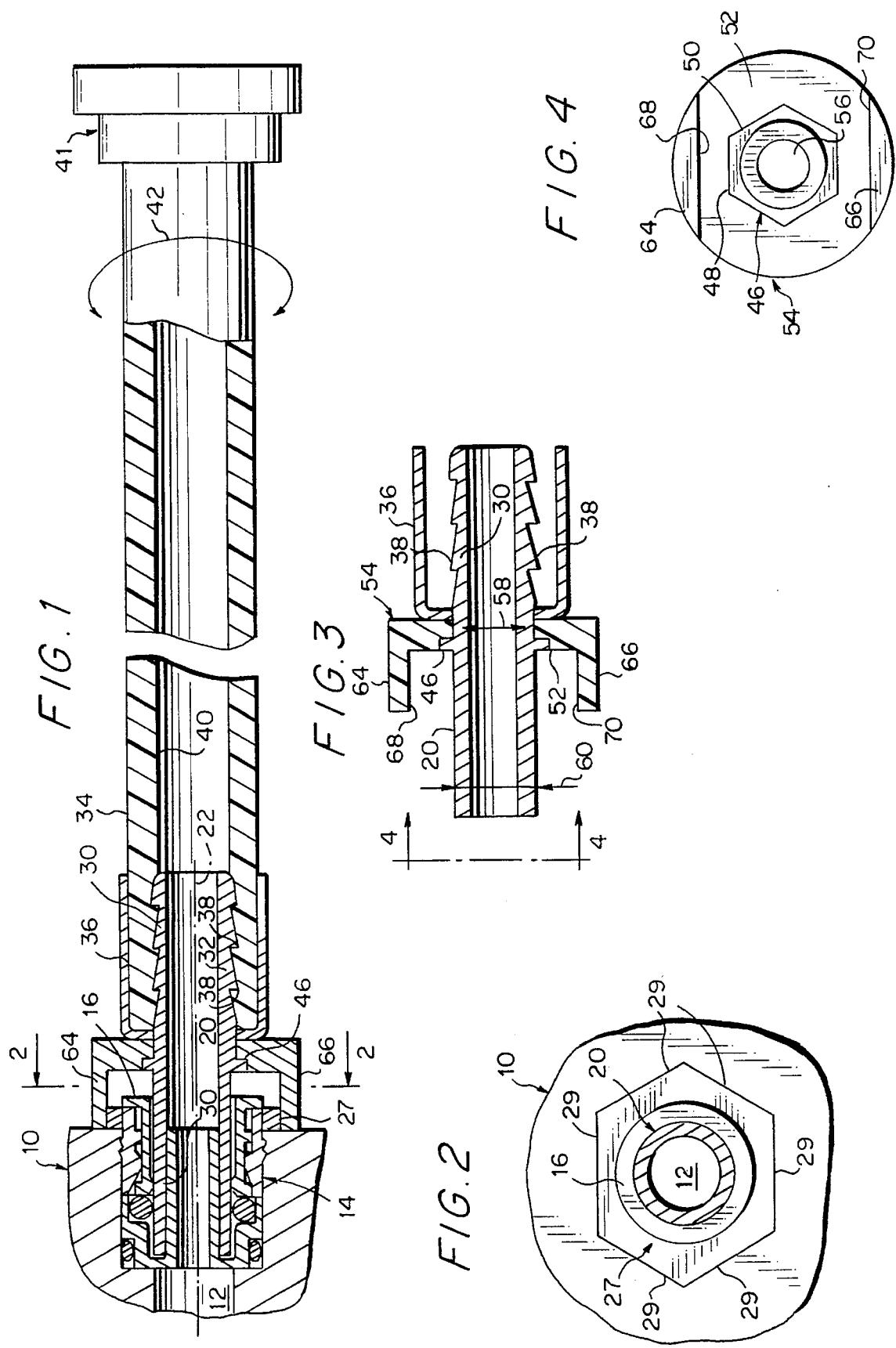

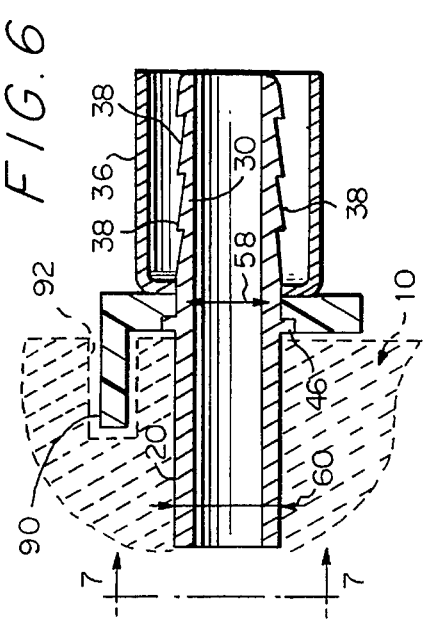
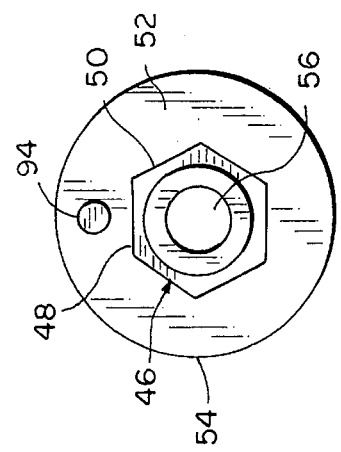
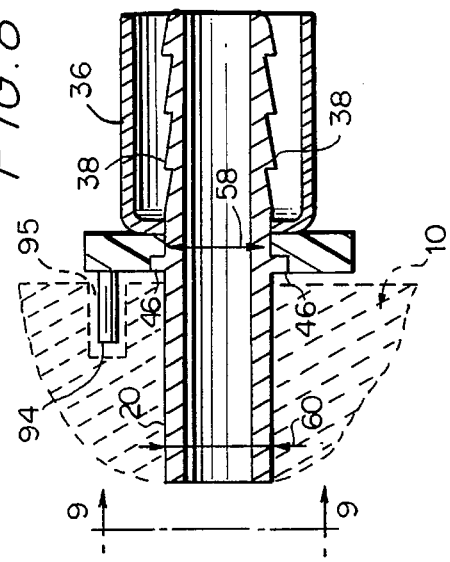
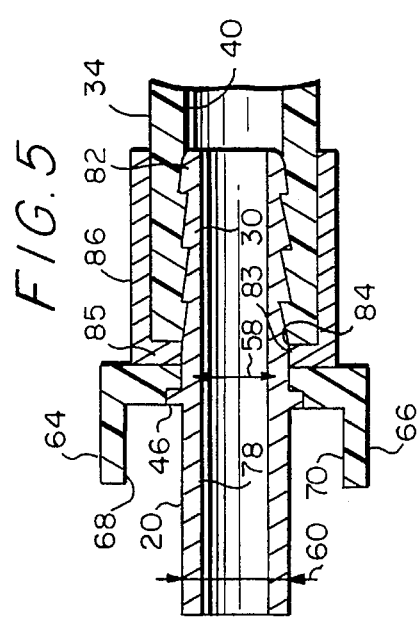
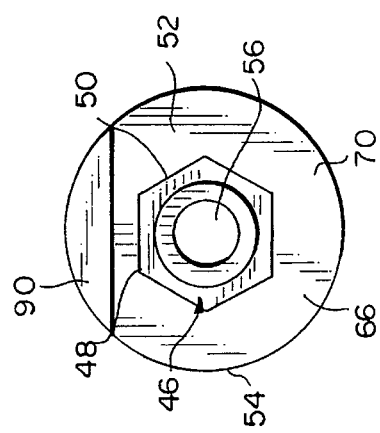

5,605,359

STABILIZED HOSE FITTING FOR COUPLING

FIELD OF THE INVENTION

This invention relates to hose fittings for couplings, and more particularly, this invention relates to stabilized hose fittings for couplings such as push-to-connect couplings.

BACKGROUND OF THE INVENTION

Pneumatic devices such as air brakes are widely used in the automotive industry. Typically, compressed air stored in tanks is applied to air brake operating mechanisms through flexible hoses which have couplings at both ends. Typically, the hose is a reinforced hose which is attached to a first end to a fixed push-to-connect coupling and at a second end to a rotary coupling. On a moving vehicle, when the rotary coupling moves with respect to the fixed coupling, the hose tends to twist. If the fixed coupling is a push-to-connect coupling, with a collet, there is a tendency for the coupling to rapidly degrade, wear out and fail because the collet cannot tolerate rotary motion of a rigid tube received therein to which the first end of the reinforced hose is fixed.

Push-to-connect couplings are now highly desirable because they are less expensive than other types of couplings, are reliable and make quick connections. In situations where reinforced hoses are subjected to torsional loads, the advantage of quick connect couplings have not been available because the couplings tend to fail.

SUMMARY OF THE INVENTION

In view of the aforementioned considerations, it is a feature of the present invention to provide an arrangement which permits push-to-connect couplings to be used with reinforced hoses subject to torsional loads.

The present invention is directed to a coupling in the form of a rigid tube for connecting a hose to a fitting, wherein the rigid tube includes a first portion which is received in the fitting and a second portion to which the hose is non-rotationally attached. The fitting includes the fixed component with a non-circular external periphery, into which fixed component the first end of the rigid tube extends for axial retention by the fitting. The afore-described coupling is improved by having a non-circular portion on the rigid tube disposed between the first and second portions thereof and an anti-rotation component having a locking portion cooperating with the non-circular portion of the fixed component to prevent rotation of the anti-rotation component with respect to the fixed component. The anti-rotation component further has a non-circular inner portion cooperating with the non-circular portion on the rigid tube to prevent rotation of the anti-rotation component with respect to the rigid tube. Consequently, torque applied to the hose is not transmitted by the rigid tube to any component of the fitting other than the fixed component.

BRIEF DESCRIPTION OF THE DRAWINGS

FIG. 1 is a side view, with portions in elevation illustrating a rigid tube used to secure a reinforced hose to a push-to-connect coupling in accordance with a first embodiment of the invention;

FIG. 2 is a view taken along lines 2—2 of FIG. 1 showing a hexagonal component which cooperates with the rigid tube to prevent the rigid tube from rotating with respect to the push-to-connect coupling;

FIG. 3 is a side view of a rigid tube assembly configured in accordance with the principles of the present invention;

FIG. 4 is an end view taken in the direction of arrows 4—4 of FIG. 3;

FIG. 5 is a view similar to FIG. 3 but showing a threaded, field attachable coupling for securing the reinforced hose to a threaded rigid tube;

FIG. 6 is a side view of a second embodiment of the invention;

FIG. 7 is an end view of the second embodiment of the invention shown in FIG. 6 taken in the direction of arrows 6—6 of FIG. 6;

FIG. 8 is a side view of a third embodiment of the invention, and

FIG. 9 is an end view of the third embodiment of the invention shown in FIG. 8 and taken in the direction of arrows 9—9 of FIG. 8.

DETAILED DESCRIPTION

Referring now to FIG. 1, there is shown a valve body 10, such as valve body used in an air brake (not shown). The valve body 10 has a bore 12 therethrough which receives a push-to-connect coupling assembly 14. The push-to-connect coupling assembly 14 may have various configurations, such as those illustrated by the assemblies disclosed in U.S. patent application Ser. No. 08/308,395, filed Sep. 20, 1994, incorporated herein by reference. Each of these assemblies has a collet, such as the collet 16, which frictionally engages a rigid tube, such as the illustrated rigid tube 20, axially inserted in the direction of axis 22 into the push-to-connect coupling 14. When one attempts to withdraw the tube 20 from the push-to-connect coupling 14, the collet 16 radially grips the rigid tube 20, preventing the tube from being withdrawn from the push-to-connect coupling and thus the valve body 10. While a valve body 10 is illustrated and discussed, the device with which the push-to-connect coupling 14 is connected may be any device with which such a coupling is used.

As is seen in FIG. 2 in combination with FIG. 1, fixed to the valve body 10 is a retaining collar 27 which has a hexagonal periphery with six flats 29. The retaining collar 27 may be threaded into internal threads at the mouth of the bore 12 and tightened so that it does not rotate with respect to the valve body 10. In any event, the retaining collar 27 is fixed to the valve body 10.

The rigid tube 20 has a first portion 30 which is received within the push-to-connect coupling 14 and is engaged by the collet 16 and a second portion 32 to which a reinforced hose 34 is crimped by a crimping collar 36. The second portion 32 of the rigid tube 20 has a plurality of annular barbs 38 which embed into the inner wall 40 of the hose 34 when the crimping collar 36 is deformed. This fixes the reinforced hose 34 non-rotatably to the second end 32 of the rigid tube 20. Typically, the reinforced hose 34 has a rotatable coupling 41 at the second end thereof, however, when the coupling 41 moves, a torsional force 42 is applied through the hose 34 to the push-to-connect coupling 14. While a rotatable coupling 41 is shown, the second end of the hose 34 may be connected by another push-to-connect coupling 14 or any other type of coupling.

As is best seen in FIGS. 3 and 4, disposed between the first portion 30 and second portion 32 of the rigid tube 20 is a radial projection 46. As is seen in FIG. 4, the radial projection 46 has a hexagonal periphery 48. As is seen in FIG. 3, the radial projection 46 is received in a hexagonal recess 50 formed in a circular portion 52 of a collar 54. The hexagonal recess 50 compliments the hexagonal periphery 48 of the projection 46 so that the radial projection is seated non-rotatably in the hexagonal recess. Just behind the hexagonal recess 50 is a circular hole 56 which has an internal diameter 58 complimenting the external diameter 60 of the rigid tube 20. Since the circular collar 54 is sandwiched between the crimping collar 36 and the radial projection 46 seated in the hexagonal recess 50, the collar 54 is rigidly fixed with respect to the rigid tube 20.

Projecting axially from the circular portion 52 of the collar 54 are a pair of arms 64 and 66 which have opposed flat surfaces 68 and 70. The opposed flat surfaces 68 and 70 are spaced the same distance apart as the flats 29 on the hexagonal periphery 28 of the retaining collar 27 which is fixed to the valve body 10. Accordingly, when the rigid tube 20 with the reinforced hose 34 attached is shoved into the push-to-connect coupling assembly 14 with the surfaces 68 and 70 of the arms 64 and 66 respectively aligned with the flat surfaces 29 of the hexagonal fitting 27, the rigid tube is restrained from rotation. Consequently, torsion applied to the hose 34 is applied to the fixed fitting 27 which does not rotate. As a result, the first end of the rigid tube 20 does not rotate within the push-to-connect coupling assembly 14 when torsion is applied to the reinforced hose 34. This prevents failure of the push-to-connect coupling assembly 14 due to the first portion 30 of the rigid tube 20 rotating within the collet 16 (see FIG. 1).

Referring now to FIG. 5, the invention is shown used with a threaded, field attachable coupling in which the reinforced hose 34 is screwed onto a threaded nipple portion 80 of the rigid tube 20. The threaded nipple portion 80 has a first large pitch thread 82 for engaging the interior surface of the wall 40 of the hose 34 and a second fine pitch thread 83 for engaging a complementary fine pitch thread 84 on an annular portion 85 of a retaining collar 86.

Referring now to FIGS. 6 and 7, there is shown a second embodiment of the invention wherein the collar 54 has a single projection 90 which is received in a complementary recess 92 in the valve body 10 to prevent rotation of the rigid tube 20 with respect to the valve body.

Referring now to FIGS. 8 and 9, there is shown a third embodiment of the invention wherein a pin 94 projects from the collar 54 and is received in a round hole 95 in the valve body 10 to prevent rotation of the rigid tube 20 with respect to the valve body.

Typically, the collar 54 is molded of nylon-6 with 15 percent glass fiber filling. A typical collar 54 will have an outside diameter of 1.25 inches and an inside diameter of 1 inch so as to compliment a hexagonal fixed member 27 with a 1 inch face-to-face diameter.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a coupling in the form of a rigid tube for connecting a first end of a hose to a fitting attached to a body member wherein the hose has a second end to which torque is applied and wherein the rigid tube has a first portion which is received and retained within a bore in the fitting and a second portion which is fixed to the first end of the hose, the improvement comprising:

a non-circular member fixed to the body member;

a non-circular radial projection on the rigid tube; and a collar having a non-circular recess therein for receiving the non-circular projection on the rigid tube, the collar including axially extending arms defining non-circular surfaces which slidably engage the non-circular member fixed to the body member to prevent rotation of the collar member, and thus the rigid tube, with respect to the body member.

2. The improvement of claim 1 wherein the non-circular member fixed to the body member is hexagonal in shape.

3. The improvement of claim 2 wherein the recess in the collar is a non-circular recess extending radially from a circular hole having a diameter equal to the diameter of the rigid tube.

4. The improvement of claim 3, wherein the recess in the collar is hexagonal and the projection on the rigid tube is hexagonal.

\* \* \* \* \*